United States Patent
Mazeau et al.

(10) Patent No.: US 11,822,004 B2
(45) Date of Patent: Nov. 21, 2023

(54) RADAR, FLYING DEVICE COMPRISING SUCH A RADAR, PROCESSING METHOD IN A RADAR EMBEDDED IN A FLYING DEVICE AND ASSOCIATED COMPUTER PROGRAM

(71) Applicant: THALES, Courbevoie (FR)

(72) Inventors: Thierry Mazeau, Brest (FR); Christian Renard, Brest (FR); Eric Gagnepain, Brest (FR)

(73) Assignee: Thales, Courbevoie (FR)

( * ) Notice: Subject to any disclaimer, the term of this patent is extended or adjusted under 35 U.S.C. 154(b) by 224 days.

(21) Appl. No.: 17/102,817

(22) Filed: Nov. 24, 2020

(65) Prior Publication Data

US 2021/0156958 A1 May 27, 2021

(30) Foreign Application Priority Data

Nov. 27, 2019 (FR) ...................... 19 13296

(51) Int. Cl.
*G01S 7/34* (2006.01)
*G01S 13/935* (2020.01)
*G01S 13/88* (2006.01)

(52) U.S. Cl.
CPC .............. *G01S 7/34* (2013.01); *G01S 13/882* (2013.01); *G01S 13/935* (2020.01)

(58) Field of Classification Search
CPC ................. G01S 13/882; G01S 13/935; G01S 2013/0254; G01S 7/34; G01S 7/4021
See application file for complete search history.

(56) References Cited

U.S. PATENT DOCUMENTS

| | | | | |
|---|---|---|---|---|
| 5,539,413 A | * | 7/1996 | Farrell | ...................... H01Q 3/22 342/372 |
| 10,651,552 B2 | * | 5/2020 | Lin | ......................... H01Q 1/242 |
| 2012/0081247 A1 | | 4/2012 | Kemkemian et al. | |
| 2016/0266239 A1 | | 9/2016 | Pavao-Moreira et al. | |
| 2017/0227635 A1 | * | 8/2017 | Lys | ......................... G01S 13/32 |
| 2017/0293017 A1 | * | 10/2017 | Evangelista | ............ G01S 7/034 |
| 2018/0373909 A1 | * | 12/2018 | Nikitin | ...................... H01Q 3/24 |
| 2019/0285738 A1 | * | 9/2019 | Iwasa | .......................... G01S 7/03 |
| 2019/0326684 A1 | * | 10/2019 | Achour | ................... G01S 13/02 |

OTHER PUBLICATIONS

Preliminary Search Report dated Jul. 3, 2020, received in counterpart application FR 19 13296 filed Nov. 27, 2019.

* cited by examiner

*Primary Examiner* — Timothy X Pham
(74) *Attorney, Agent, or Firm* — Knobbe, Martens, Olson & Bear, LLP

(57) ABSTRACT

A radar, flying device including such a radar, processing method in a radar embedded in a flying device and associated computer program are disclosed. In one aspect, the radar includes a transceiver antenna including a plurality of radiating elements configured to transmit and receive an electromagnetic wave. The radar includes an antenna gain control unit, by activating/inhibiting radiating elements, in transmission and/or reception configured to keep the reception level of an electromagnetic wave below a determined threshold below the saturation zone of the antenna, as well as by activating/inhibiting radiating elements in reception, configured to compensate the amplitude variation of the ground/sea clutter, over the duration of the reception.

8 Claims, 5 Drawing Sheets

RADAR, FLYING DEVICE COMPRISING SUCH A RADAR, PROCESSING METHOD IN A RADAR EMBEDDED IN A FLYING DEVICE AND ASSOCIATED COMPUTER PROGRAM

BACKGROUND

Technological Field

The described technology relates to the field of radars, in particular airborne radars, comprising a transceiver antenna including a plurality of radiating elements distributed over a surface and configured for transmitting and receiving electromagnetic waves, the radar comprising an antenna gain control unit.

Description of the Related Technology

In the related technology, with reference to FIG. 1 showing an aircraft 20 embedding a radar emitting electromagnetic waves 31, the echoes coming from the surface 30 (ground, sea, etc.) located below the aircraft 20 and reflecting the emitted electromagnetic waves 31 saturate the radar on reception when it is located at low altitude, that the echoes coming from the part of the emitted wave 31 having traveled a distance D0 from the radar 20 to the reflective surface 30 will have higher amplitudes and be less delayed than the echoes coming from the reflection of a part of the emitted wave 31 having traveled a longer distance D1 from the radar 20 to the reflective surface 30.

Curve L1 in FIG. 2 shows a graph providing the general appearance, on the y-axis, of the power of the echoes received by the antenna of the radar as a function, on the x-axis, of the distance D traveled by the emitted wave 31 between the radar and the reflective surface (or similarly of the time delay $\tau$ between the transmission of a wave and the reception by the radar of the echo of this wave portion $D = c/2 \cdot \tau$, where c is the celerity); the saturation zone is shown schematically by reference Zs.

To avoid the situation at the input of the radar caused by the high power of the echoes received by the radar at small distance D or delay $\tau$ and also to compensate the corresponding amplitude variabilities, it is known to have a Sensitivity Time Control (STC) attenuator, which performs two functions:
  attenuating the gain of the receiving channel to ensure that the maximum level of the received signals is not in the saturation zone of the receiver;
  further performing gain compensation processing, called STC compensation processing hereinafter, making it possible to compensate for the level variation of the echoes received as a function of the delay $\tau$, therefore of the distance D, by adjusting the gain of the receiver with an inverse gain law relative to the variation of the levels as a function of $\tau$ (which has form $F(\tau) = 1/\tau^{\alpha}$, with $\alpha$ a real number).

This STC attenuator must therefore be placed, in order to avoid saturation, very far upstream of the receiving channel of the radar, on the radiofrequency signal received at the antenna, which results in increasing the noise factor of the reception of the radar, this effect then also having to be compensated in real time as a function of the distance D (of the delay $\tau$). Furthermore, such an attenuator must be calibrated in frequency and in temperature to compensate the gain dispersions. Such an STC attenuator solution is further particularly complex to deploy in the modern architectures of radars, which have an increasingly high number of reception channels.

SUMMARY OF CERTAIN INVENTIVE ASPECTS

To that end, according to a first inventive aspect, the described technology includes a radar of the aforementioned type, characterized in that the antenna gain control unit is configured for feedback controlling, through an adjustment loop, the antenna gain in transmission and/or reception by a turning on or off radiating elements of the plurality of radiating elements, in order to keep the reception level of the electromagnetic waves below a determined threshold below the saturation zone of the radar.

The described technology thus makes it possible to maintain a level of reception appropriate for the performance of the receiver, and in particular to avoid the saturation of the radar on reception.

It thus uses the fact that, in reference to FIG. 2, the lower the height h of the moving device 20 is relative to the surface 30, the higher the power of the close echoes will be and the lower the incidence a of the emitted wave 31 will be relative to the surface 30, the greater the spreading out over time of the ground clutter (and therefore if applicable the saturating levels) is.

In embodiments, the radar according to the described technology further includes one or more of the following features:
  the antenna is configured for emission from a given height relative to a given surface and at a given incidence angle, the gain control unit is configured, in the adjustment loop, for performing at least one of the following operations:
  determining the deviation between the current level of the received electromagnetic wave and a reference level, in order to determine the gain adjustment as a function of the deviation and to command the turning off or on of radiating elements in transmission and/or reception based on the determined gain adjustment;
  determining at least one set of value(s) comprising at least one value among the given height and the given incidence angle, in order to determine the gain adjustment based on each value of the determined set of value(s) and to command the turning off or on of radiating elements in transmission and/or reception based on the determined gain adjustment;
  the gain control unit is configured, in the adjustment loop, for adjusting the gain according to a function calculating the gain value based on at least each value of the set of value(s), the function being a decreasing function of the value when the value is the height and an increasing function of the value when the value is the incidence angle;
  the gain control unit is configured for modifying the gain according to at least one operation among a nonzero power modification command emitted by each radiating element and a command to turn on or off at least some of the radiating elements;
  the radar comprises a compensating module configured for attenuating the amplitude of a received electromagnetic wave based on the distance traveled to the surface by the electromagnetic wave, the compensating module being configured for performing this attenuation on digital samples of the received electromagnetic waves based on the distance and/or for performing this attenuation by a command to turn on or off at least some of the radiating elements determined based on the distance.

According to a second aspect, the described technology includes a flying device comprising an embedded radar according to the first aspect of the described technology.

According to a third aspect, the described technology includes a processing method in a radar embedded in a flying device, the radar comprising a transceiver antenna including a plurality of radiating elements distributed over a surface and configured for the transmission and reception of an electromagnetic wave, the method comprising the following steps:
  transmitting an electromagnetic wave from the antenna and receiving an electromagnetic wave by the antenna;
  the method being characterized in that it comprises the following step implemented by an electronic gain control unit of the radar:
  feedback controlling, through an adjustment loop, the antenna gain in transmission and/or reception by a turning on or off radiating elements of the plurality of radiating elements, in order to keep the reception level of the electromagnetic waves below a determined threshold below the saturation zone of the radar.

In embodiments, the method according to the described technology further includes one or more of the following features:
  the adjustment loop comprises at least one of the steps among steps a and b:
  a/ determining the deviation between the current level of the received electromagnetic wave and a reference level, determining the gain adjustment as a function of the deviation and commanding the turning off or on of radiating elements in transmission and/or reception based on the determined gain adjustment;
  b/ the transmission having taken place from a given height relative to a given surface (30) and at a given incidence angle, determining at least one set of value(s) comprising at least one value among the given height and the given incidence angle, determining the gain adjustment based on each value of the determined set of value(s) and commanding the turning off or on of radiating elements in transmission and/or reception based on the determined gain adjustment;
  the adjustment loop comprises adjusting the gain according to a function calculating the gain value based on at least each value of the set of value(s), the function being a decreasing function of the value when the value is the height and an increasing function of the value when the value is the incidence angle.

According to a fourth aspect, the described technology includes a processing method that can be broken down into a computer program comprising software instructions which, when executed by a computer, carry out a method as defined above.

BRIEF DESCRIPTION OF THE DRAWINGS

These features and advantages of the described technology will appear upon reading the following description, provided solely as an example, and done in reference to the appended drawings, in which.

DETAILED DESCRIPTION OF CERTAIN INVENTIVE EMBODIMENTS

Figure 3:
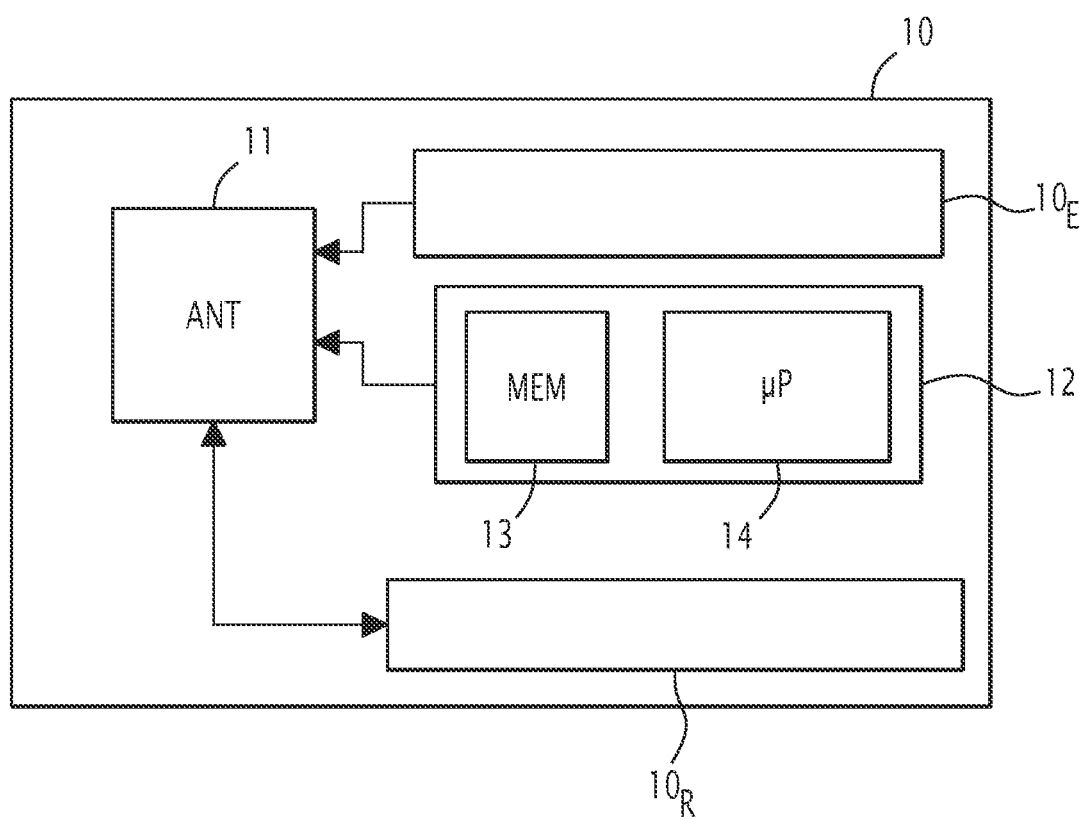
FIG. 3 is a schematic view of a radar in one embodiment of the described technology.

FIG. 3 shows a radar 10 in one embodiment of the described technology.

The radar 10 is configured, when it is embedded in a flying device such as an aircraft 20, for detecting the presence of target objects such as airplanes, boats, or rain, and/or determining the position as well as the speed of such target objects. Indeed, the waves sent by the radar 10 are in particular reflected by the target object, and the return signals (called radar echo) are captured and analyzed by the radar.

The radar 10 includes a transceiver antenna 11, an antenna gain control unit 12, a radar transmission unit 10E and a radar reception unit $10_R$.

The transceiver antenna 11 is configured for transmitting an electromagnetic wave at a pointing angle and for receiving an electromagnetic wave.

In embodiments, the antenna 11 is an active electronically scanned array: in reality, the antenna is a set of several (typically several hundred) radiating elements, called sub-arrays or elementary arrays; these elementary arrays are independent of one another and each have their own source. In embodiments, the antenna 11 is AESA (Active Electronically Scanned Array), MIMO (Multiple Input Multiple Output), etc.

In one considered embodiment, the antenna 11 is for example made up of a phased array.

Figure 4:
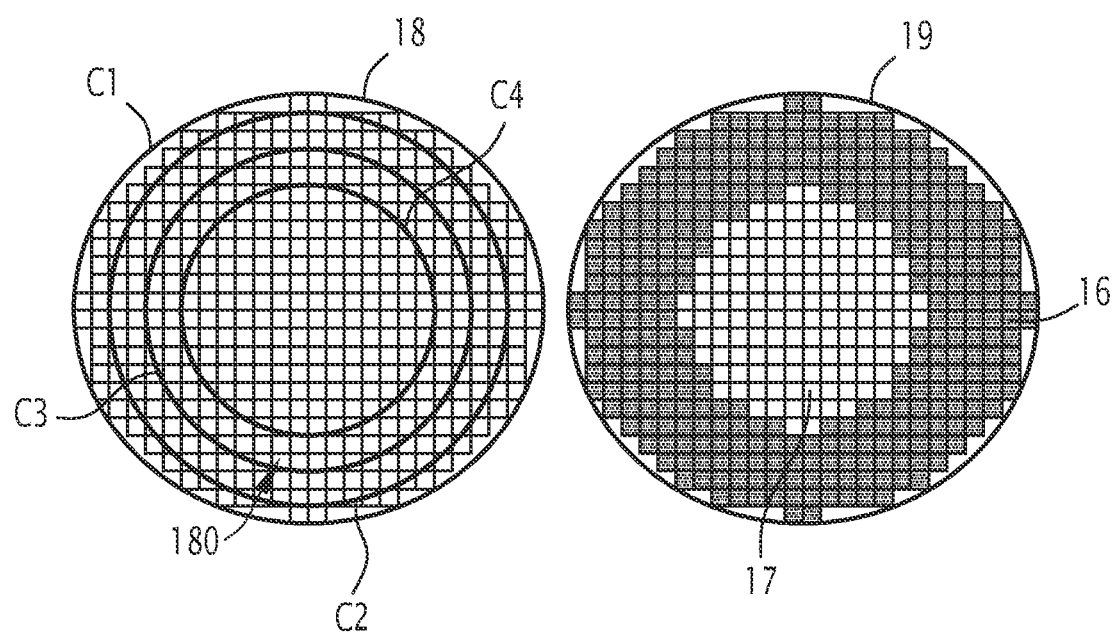
FIG. 4 is a schematic view of an antenna in one embodiment of the described technology.

In the considered embodiment, the antenna 11 comprises, in reference to FIG. 4, a surface 18 and a plurality of elementary antennas 180 distributed on the surface 18, arranged in a matrix and here drawing a substantially circular shape. In other embodiments, the shape of the transmission surface is different: square, rectangular, triangular, etc.

Each elementary antenna 180 constitutes a radiating element configured for transmitting, at a given frequency and with a given phase, its own electromagnetic wave in a direction normal to the surface 18.

In the embodiment considered here, each radiating element transmits at the same frequency with an amplitude and a phase specific to each radiating element.

In embodiments, the beam(s) of the antenna 11 is/are controlled in terms of angular position, etc.

The radar 10 includes a transmission unit 10E configured for generating the wave to be transmitted by the antenna 11. The transmission unit 10E for example comprises, in a known manner, a permanent oscillator, an amplifier and a modulator (not shown). In one embodiment, it is further configured for commanding the beam(s) of the antenna 11 in terms of position, movement, etc.

The radar 10 includes a reception unit $10_R$ configured for processing a wave received by the antenna 11 and coming from the reflection of the transmitted wave, in order to determine the existence (and/or the position and/or the speed) of one or several targets.

In one embodiment, the reception block $10_R$ includes a processing chain to which the output signal from the antenna is supplied; the chain includes the following successive modules: a channel forming module, a module for amplification of each of the microwave frequency channels, a module for transposition to intermediate frequency, an encoding module and a digital processing module.

In the considered embodiment, the radar 10 further includes a control unit 12 of the antenna gain 11 in reception and/or transmission; in the specific considered case, the antenna gain control unit 12 is an EIRP (Equivalent Isotropically Radiated Power) control unit 12.

The EIRP control unit 12 comprises a regulating loop in order to keep the reception level of the electromagnetic wave below a determined threshold (chosen so that it is below the saturation level of the receiver) through an adjustment loop of the EIRP of the transceiver antenna; it is configured for triggering changes of the EIRP used for the transmission of an electromagnetic wave by the antenna 11.

The regulating loop can be implemented in different ways, which may optionally be combined, two of which are explained hereinafter.

In a first embodiment, the EIRP control unit 12 is configured, for example before each transmission of a new radar pulse, for determining the current level of the signal received by the antenna 11 of the radar 10 corresponding to the echoes of the preceding emitted pulse. Then, the EIRP control unit 12 is configured for comparing this level with a reference level Pref (for example Pref=0 dBm), the deviation determined after this comparison making it possible to deduce the desired attenuation Att therefrom and to trigger the changes to be made to the EIRP based on the attenuation to be provided. For example, the determined current level is that of the maximum signal measured at the end of the receiving channel, after the digital processing. Such a regulating loop makes it possible to keep the EIRP around the set value, here 0 dBm, and therefore makes it possible to keep the level of the signal in a zone appropriate for the performance of the receiver, and in particular to avoid saturating the receiver.

For example, if the maximum received level at the end of the receiving channel has a deviation of 6 dB above the reference level, the level is brought back to the reference level, for example as described later (here for example by turning off half of the elementary antennas).

In a second embodiment, the EIRP is adjusted by the regulating loop based on one or several parameters among the transmission height of the electromagnetic wave and the incidence angle α of the transmitted wave relative to the reflective surface.

In such an embodiment, the current value of the transmission height is provided to the EIRP control unit 12 by navigation instruments of the aircraft or determined by the RADAR in one embodiment (air/ground telemeter and/or the current value of the incidence angle α is provided to the EIRP control unit 12 (α is for example a usage setpoint of the RADAR determined by the usage modes of the RADAR or imposed by the pilot of the aircraft.

In one embodiment, the incidence angle refers to the angle between the axis of the RADAR beam and the horizon.

In one embodiment, the EIRP control unit 12 comprises a memory 13 and a microprocessor 14. The memory 13 comprises software instructions which, when executed on the microprocessor 14, implement the steps for which the EIRP control unit 12 is responsible that are described in reference to FIG. 5 hereinafter.

In one embodiment, the EIRP control unit is integrated within a digital card of the COTS type.

In another embodiment, the EIRP control unit 12 is made in the form of a programmable logic component, such as an FPGA (Field Programmable Gate Array), or in the form of a dedicated integrated circuit, such as an ASIC (Application Specific Integrated Circuit).

Figure 5:
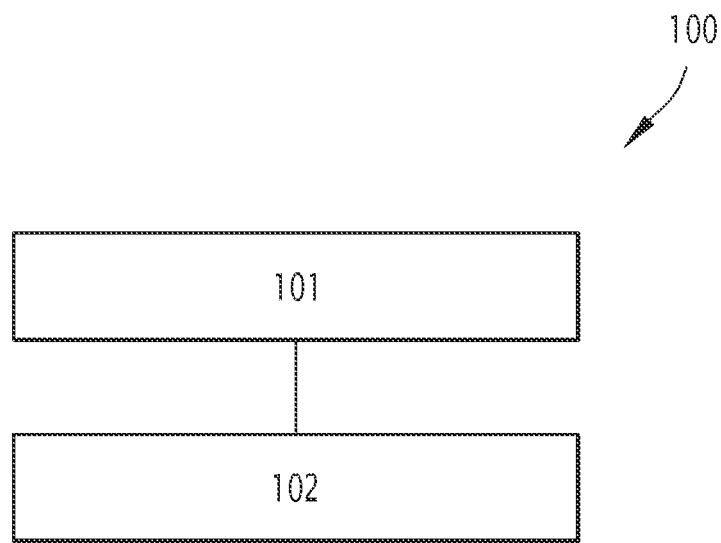
FIG. 5 is a flowchart of steps implemented in one embodiment of the described technology.

FIG. 5 describes a set 100 of steps for implementing the adjustment of the antenna gain in transmission and/or reception, in the specific considered case, here for adjusting the EIRP, through a regulating loop in one embodiment, during an operational phase of the radar 10 implemented during a flyover of an analysis zone by the aircraft 20 embedding the radar 10: the radar 10 emits an electromagnetic wave using the antenna 11 toward a surface 30 and receives the corresponding radar echoes via the antenna 11, which it then processes.

In a step 101, the antenna gain control unit 12 determines whether antenna gain adjustments must be implemented in order to keep the reception level of the electromagnetic waves below a determined threshold, and thus to stay outside the saturation range of the receiver.

In a step 102, the antenna gain control unit 12 triggers, with the antenna 11, the implementation of the gain change thus determined.

In the particular case of EIRP control, in the first embodiment, before the emission of a new radar pulse, the EIRP control unit 12 determines the deviation between the current power of the signal received by the receiver of the radar corresponding to the echoes from the previous pulse and the reference power, then it determines the change in EIRP to be implemented based on this deviation.

In the second embodiment, the EIRP control unit 12 receives the updated value of the height h of the radar 10 relative to the surface being overflown and/or the updated value of the incidence angle α.

The EIRP control unit 12, after receiving the updated value(s), determines a change in EIRP 11 based on this updated value (or these updated values).

In a step 102, the EIRP control unit 12 triggers, with the antenna 11, the implementation of the EIRP change thus determined.

The described technology thus makes it possible to modulate the EIRP in transmission based on the level of clutter.

There are also different solutions for adjusting the EIRP: for example, by adjusting the power transmitted by each elementary antenna 180, by increasing or decreasing the power emitted by each elementary antenna 180 emitting a nonzero power and/or, as considered hereinafter, by turning off or on a certain number of these elementary antennas.

In one embodiment, in order to decrease the EIRP of the antenna 11 shown on the left in FIG. 4 where each elementary antenna 180 is active, the EIRP control unit 12 commands the placement in the inactive state (zero emitted power) of the elementary antennas 180 located on the periphery of the transmission surface 18: the elementary antennas then deactivated in transmission are shown in black in the right part of FIG. 4. This results in broadening the wave beam and decreasing the total radiated power.

In another embodiment, the reverse is commanded: only the elementary antennas 180 located in the peripheral ring remain active, while the central elementary antennas are deactivated: the directivity and the angular width of the beam are then similar to that of the antenna 11 with all of its elementary antennas active, the reduction in EIRP then being in the ratio Na/NT as described below.

Or:
$a_0$ the effective surface of an elementary antenna;
$N_k$ the number of elementary antennas 180 on the surface 18;
$\lambda$: the wavelength;
it is known that the gain (linear) in the pointing axis, perpendicular to the surface 18, is $G_k$:

$$G_k = \frac{4 \cdot \pi \cdot a_0}{\lambda^2} \cdot N_k$$

(Nb: the misaligned gain of φ is:

$$G_d = \frac{4 \cdot \pi \cdot a_0}{\lambda^2} \cdot N_k \cdot \cos\varphi).$$

Each elementary antenna 180 delivers a power p.
The total power $P_k = p \cdot N_k$
The EIRP of the antenna 11 is equal to $P_k \cdot G_k$.
The determination of the number $N_a$ of active elementary antennas to be kept (and therefore the number of elementary antennas to be deactivated $N_d$ with $N_d = N_T - N_a$ is for example done by the EIRP control unit 12 using the following formula:

$$N_a = \sqrt{\frac{N_T^2}{Att}}$$

Where:
$N_T$ is the total number of elementary antennas 180;
$N_a$ is the number of active elementary antennas 180;
Att is the attenuation ratio of the desired power of the reception signal (in dB).

The attenuation, in the first embodiment, is determined based on the deviation determined between the current reception level and the reference level.

For example, in a case where h is 1000 m, the incidence and the aperture of 5°, the regulating loop thus makes it possible, in one particular embodiment, to vary the channel gain from 135 dB to 143 dB according to D, in order to contain the level of clutter around 0 dBm, or a variation of 8 dB.

To determine what EIRP adjustment is needed, the maximum received power is determined, corresponding to the least delayed signal.

For example, a clutter level at 0 dBm is desired, for the channel gain in the receiver to be 140 dB and the max level of the signal to be −134 dB, the EIRP must then be decreased by 6 dB, or a linear decrease of 4, or $N_a$=500.

In the second described embodiment, the attenuation is determined based on value tables defining the attenuation value based on a and h (for example from STC tables that also depend on h and a).

Example: if $N_T$=1000 and Att=2, then the number of elementary antennas to be kept active is $N_a$, with $$N_a = \sqrt{\frac{1000^2}{2}} = 707$$

This formula yielding $N_a$ is easy to demonstrate. As seen above, the EIRP is equal to $$P_k \cdot G_k = p \cdot N_k^2 \cdot \frac{4 \cdot \pi \cdot a_0}{\lambda^2} = p \cdot N_k^2 \cdot Cte.$$

This means that, calling $EIRP_T$ the EIRP of the antenna 11 when all ($N_T$) of its elementary antennas 180 are active and $EIRP_a$ the EIRP of the antenna 11 when only $N_a$ of its elementary antennas 180 are active:

$$EIRP_T = p \cdot N_T^2 \cdot Cte$$

$$EIRP_a = p \cdot N_a^2 \cdot Cte; \text{ and that therefore}$$

$$Att = \frac{EIRP_T}{EIRP_a} = \frac{N_T^2}{N_a^2}.$$

The surface of the antenna is $S_k = N_k \cdot a_0$; its diameter is $$D_k = 2 \cdot \sqrt{\frac{N_k \cdot a_0}{4 \cdot \pi}}$$

in the case of a round surface;

$$G_k = 6 \cdot \left(\frac{D_k}{\lambda}\right)^2$$

The aperture angle is $$\theta_k = 70 \cdot \frac{\lambda}{D_k}.$$

For a constant α, when h increases, the level of the received signal decreases, Att decreases, the EIRP adapted according to the described technology increases.

For a constant h, when a (considered in absolute value) increases (tends toward plumb), the level of the received signal increases, therefore, according to the described technology the value Att increases, the EIRP decreases.

The EIRP is therefore a decreasing function of h and an increasing function of |α|.

In one embodiment, the receiving unit $10_R$ further includes, in the embodiment, a module of the STC type performing STC compensating processing, i.e., compensating the variability of the amplitudes of the digital samples of the received echo signals based on the distance D and the time t. This STC processing is for example done after encoding, in the digital processing module, therefore far downstream, which reduces the noise relative to the prior art.

Figure 1:
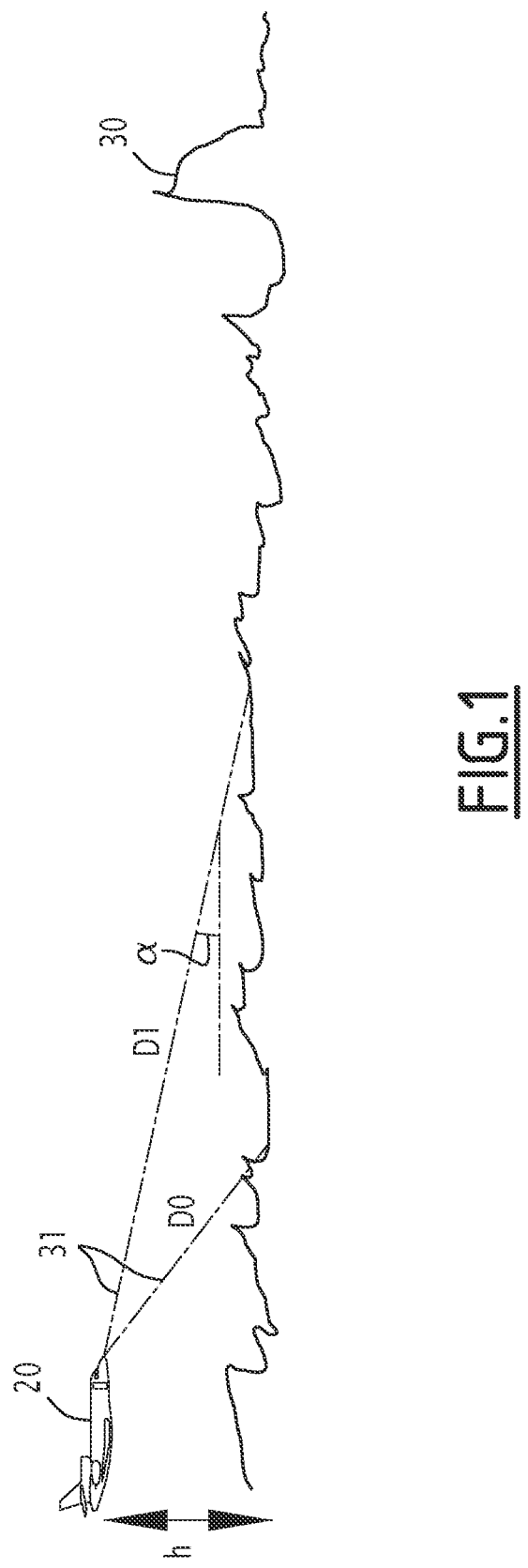
FIG. 1 shows a view of an aircraft embedding a radar according to one embodiment of the described technology.
Figure 2:
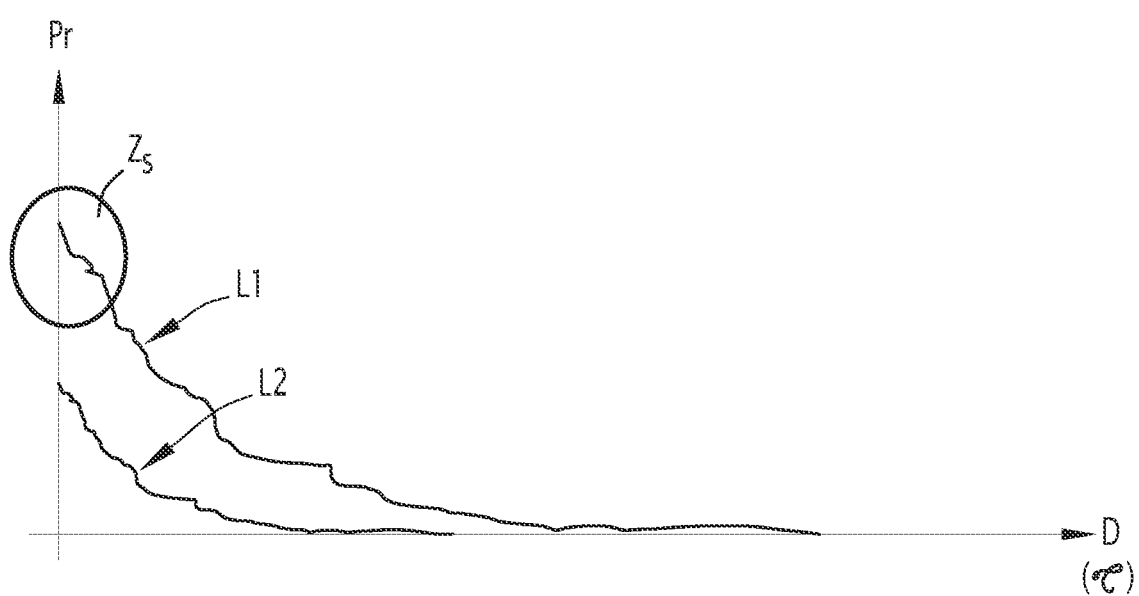
FIG. 2 is a view of a graph showing the electromagnetic wave power received by a radar based on the distance traveled by a wave received as an echo or the corresponding propagation time, in particular in one embodiment of the described technology.

Curve L2 in FIG. 2 shows a graph providing the general appearance, on the y-axis, of the power of the echoes received by the antenna of the radar as a function, on the x-axis, of the distance D traveled by the emitted wave 31 between the radar and the reflective surface (or similarly time t) after implementation of the EIRP attenuation in transmission according to the described technology to avoid saturating the input of the radar 10, for a height and an incidence identical to those of curve L1 corresponding to a maximum EIRP.

In one embodiment, the configuration of the elementary antennas in reception remains unchanged, while the configuration of the elementary antennas in transmission is adjusted according to the described technology.

Other embodiments of the described technology can, however, be implemented, aside from the limitation of the maximum received level by EIRP (in transmission as a result) with STC compensation processing by digital processing of the signal as described above, for example, in embodiments that can optionally be combined with the previous one and/or with one another:

limiting the maximum received level by limiting the antenna gain in reception by the antenna gain control unit 12 below the saturation threshold of the radar 10 (by turning off/on elementary antennas) and performing the STC compensation by digital processing of the received signal;

limiting the maximum received level below the saturation threshold of the radar 10 and performing the STC compensation processing by the antenna gain control unit 12, both by adjustment by the latter of the antenna gain upon reception:

either by applying preestablished STC compensation laws depending on the altitude and the incidence, or by regulating the received level around a reference value chosen to be in a work zone compatible with the characteristics of the receiver in particular outside its saturation zone;

limiting the maximum received level below the saturation threshold of the radar 10 by limiting the EIRP (in transmission as a result) by the antenna gain control unit 12 as described above for example and performing the STC compensation by the antenna gain control unit 12 by further adjusting the antenna gain on reception.

The last two listed embodiments only require that the elementary antennas be controllable separately in transmission and reception.

In the embodiments with adjustment of the antenna gain in reception to prevent the saturation of the receiver, the gain adjustment in reception is iterated for example upon each new string of received echoes, that is to say in a new distance slot of a sequence of distance slots considered to correspond to the echoes successively received in a same emitted pulse.

In one embodiment, in reference to FIG. 4, the gain control unit 12 in transmission and/or reception is configured for adjusting the antenna gain in transmission and/or reception stepwise by first activating only the elementary antennas in transmission and/or reception in the ring between the circles C1 and C2, then next by further activating only the elementary antennas between C2 and C3 if necessary, then by activating only the elementary antennas between C3 and C4, if necessary. This arrangement, similar to the operation of a camera diaphragm, makes it possible to vary the gain without changing the aperture of the antenna. Alternatively, the rings can be turned on successively on the contrary by starting from the center moving toward the outside, which changes both the gain and the aperture (with the central ring or the central disc only: the EIRP is minimal, the aperture is maximal, then the gain increases and the aperture decreases with the number of rings activated). In one embodiment, to perform STC compensation processing, the outermost ring, that is to say between C1 and C2, is activated in reception, then the other rings are activated in turn starting from the outermost ring to the innermost ring.

The width of each ring can be defined such that the gain pitch is constant; to do this, the number of elementary antennas activated on each ring must be the same; the width of the ring is inversely proportional to the diameter of the ring.

The width of the finest ring is defined by the presence of at least one module for the smallest possible ring width.

This number of modules determines the width of the following rings, and as a result, their number.

In summary, the method takes place as follows as a function of time:

For a transmission phase:
the modules located in the concentric rings of the antenna in transmission are activated to adjust the gain of the antenna by switching of the rings in a contiguous manner (like a diaphragm), so as to avoid the saturation of the receiver. The gain of the antenna in transmission is [therefore] adjusted upon each RADAR recurrence with a constant value over the entire duration of the transmission impulse.

For a reception phase:
the modules located in the concentric rings of the antenna in reception are activated to adjust the gain of the antenna by switching of the rings in an adjacent manner (like a diaphragm), so as to compensate the amplitude variation of the reception echoes as a function of time (or distance). The gain will therefore be adjusted dynamically during reception so as to have a minimum gain at the beginning of reception and maximum at the end, as is the case with an STC variable attenuator.

NB:
In the transmission phase, it is also possible to adjust the gain of the transmission antenna by first activating the smallest rings (still in a contiguous manner). In this case, the aperture of the antenna will not be constant.

The described technology makes it possible to eliminate the STC attenuators conventionally arranged at the head of microwave frequency receivers to prevent saturation by the signal returning from nearby ground, and thereby to improve the noise factor of the receiving channel.

This described technology lightens the physical architecture of the RADARs, as well as the associated adjustments/calibrations, and therefore decreases their costs.

It also lightens the processing by eliminating the calibrations of the STC attenuators.

The stealth of the RADAR is further improved, due to the decrease in the EIRP rather than by decreasing the gain in reception.

It will be noted that the described technology has been described above in reference to a radar embedded in an aircraft. In other embodiments, the radar 10 during its use for target detection purposes is embedded in other flying devices, which may be moving or stationary, such as drones, helicopters, balloons, etc.

While there have been shown and described and pointed out the fundamental novel features of the invention as applied to certain inventive embodiments, it will be understood that the foregoing is considered as illustrative only of the principles of the invention and not intended to be exhaustive or to limit the invention to the precise forms disclosed. Modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplate. All such modifications and variations are within the scope of the invention as determined by the appended claims when interpreted in accordance with the breadth to which they are entitled.

What is claimed is:

1. A radar comprising:
a transceiver antenna including a plurality of radiating elements distributed over a surface and configured to transmit and receive an electromagnetic wave;
an antenna gain control unit,
wherein the antenna gain control unit is configured to feedback control, through an adjustment loop, the antenna gain in transmission and/or reception by turning on or off radiating elements of the plurality of radiating elements, in order to keep the reception level of the electromagnetic waves below a determined threshold below the saturation zone of the radar, and
wherein the antenna is further configured to emit from a given height relative to a given surface and at a given incidence angle, the gain control unit is configured, in the adjustment loop, to perform at least one of the following operations:
determining the deviation between the current level of the received electromagnetic wave and a reference level, in order to determine the gain adjustment as a function of the deviation and to command the turning off or on of radiating elements in transmission and/or reception based on the determined gain adjustment, and
determining at least one set of value(s) comprising at least one value among the given height and the given incidence angle, in order to determine the gain adjustment based on each value of the determined set of value(s) and to command the turning off or on of radiating elements in transmission and/or reception based on the determined gain adjustment.

2. The radar according to claim 1, wherein the gain control unit is further configured, in the adjustment loop, to adjust the gain according to a function calculating the gain value based on at least each value of the set of value(s), the function being a decreasing function of the value when the value is the height and an increasing function of the value when the value is the incidence angle.

3. The radar according to claim 1, wherein the gain control unit is further configured to modify the gain according to at least one operation among a nonzero power modification command emitted by each radiating element and a command to turn on or off at least some of the radiating elements.

4. The radar according to claim 1, further comprising:
a compensating module configured to attenuate the amplitude of a received electromagnetic wave based on the distance traveled to the surface by the electromagnetic wave, the compensating module being configured to perform this attenuation on digital samples of the received electromagnetic waves based on the distance and/or to perform the attenuation by a command to turn on or off at least some of the radiating elements determined based on the distance.

5. A flying device comprising an embedded radar according to one of the preceding claims.

6. A processing method in a radar embedded in a flying device, the radar comprising a transceiver antenna including a plurality of radiating elements distributed over a surface and configured to transmit and receive an electromagnetic wave, the method comprising:
transmitting an electromagnetic wave from the antenna and receiving an electromagnetic wave by the antenna;
wherein the method comprises the following implemented by an electronic gain control unit of the radar:
feedback controlling, through an adjustment loop, the antenna gain in transmission and/or reception by turning on or off radiating elements of the plurality of radiating elements, in order to keep the reception level of the electromagnetic waves below a determined threshold below the saturation zone of the radar, wherein the adjustment loop comprises at least one of a and b:
a) determining the deviation between the current level of the received electromagnetic wave and a reference level, determining the gain adjustment as a function of the deviation and commanding the turning off or on of radiating elements in transmission and/or reception based on the determined gain adjustment; and
b) the transmission having taken place from a given height relative to a given surface and at a given incidence angle, determining at least one set of value(s) comprising at least one value among the given height and the given incidence angle, determining the gain adjustment based on each value of the determined set of value(s) and commanding the turning off or on of radiating elements in transmission and/or reception based on the determined gain adjustment.

7. The processing method in an embedded radar according to claim 6, wherein the adjustment loop comprises adjusting the gain according to a function calculating the gain value based on at least each value of the set of value(s), the function being a decreasing function of the value when the value is the height and an increasing function of the value when the value is the incidence angle.

8. A computer program comprising software instructions which, when executed by a computer, carry out a method according to claim 6.

* * * * *